US012683803B1

(12) United States Patent
Chandran et al.

(10) Patent No.: US 12,683,803 B1
(45) Date of Patent: Jul. 14, 2026

(54) SYSTEM AND METHOD FOR MULTI-FACTOR AUTHENTICATION OF A COMMUNICATION DEVICE METADATA WITH USER AUTHENTICATION

(71) Applicants: Deepak R Chandran, Monmouth Jct, NJ (US); Janaki D Chandran, Monmouth Jct, NJ (US)

(72) Inventors: Deepak R Chandran, Monmouth Jct, NJ (US); Sanath Kumar, Karkala (IN); Deepashri Sanath, Karkala (IN)

(73) Assignees: Deepak R. Chandran, Monmouth JCT, NJ (US); Janaki D. Chandran, Monmouth JCT, NJ (US)

( * ) Notice: Subject to any disclaimer, the term of this patent is extended or adjusted under 35 U.S.C. 154(b) by 0 days.

(21) Appl. No.: 19/308,454

(22) Filed: Aug. 25, 2025

(51) Int. Cl.
*G06F 21/32* (2013.01)
*H04L 9/32* (2006.01)
*H04L 9/08* (2006.01)

(52) U.S. Cl.
CPC .......... *H04L 9/3247* (2013.01); *H04L 9/3231* (2013.01); *G06F 21/32* (2013.01); *H04L 9/0866* (2013.01)

(58) Field of Classification Search
CPC ... H04L 9/3247; H04L 9/3231; H04L 9/0866; G06F 21/32
See application file for complete search history.

(56) References Cited

U.S. PATENT DOCUMENTS

| | | | |
|---|---|---|---|
| 12,020,692 B1 * | 6/2024 | Ryali | ....................... G10L 15/08 |
| 2013/0080166 A1 * | 3/2013 | Buffum | ................... G07C 9/37 |
| | | | 704/236 |
| 2025/0141682 A1 * | 5/2025 | Hutchinson | ............. G06F 21/32 |

* cited by examiner

*Primary Examiner* — Ellen Tran
(74) *Attorney, Agent, or Firm* — Vani Moodley, Esq.

(57) ABSTRACT

The present invention relates to a system and a method for multi-factor authentication of communication device metadata. The system includes a communication device, and a recipient device that work together to authenticate communication device metadata using digital signatures and a user's identity through voice biometrics. User enrolls into the system by providing voice samples, from which a unique voiceprint is created and stored. For authenticating the communication device metadata with user authentication, the user issues a voice command, and the system extracts voice signatures which are compared with the stored voiceprint to verify the user's identity. Upon successful authentication, the communication device metadata is accessed, and corresponding digital signatures are generated. Further, the system authenticates the generated digital signatures and user's identity. If both are verified, the communication device metadata is considered valid and used for further processing.

12 Claims, 10 Drawing Sheets

SYSTEM AND METHOD FOR MULTI-FACTOR AUTHENTICATION OF A COMMUNICATION DEVICE METADATA WITH USER AUTHENTICATION

TECHNICAL FIELD

The present invention relates to an authentication of a communication device metadata. More particularly, the present invention relates to a system and method for multi-factor authentication of a communication device metadata with user authentication.

BACKGROUND

Existing systems authenticate the user by recording user's speech and creating a digital signature based on the audio data without specifically using voice signatures or voice-prints of the user. This digital signature is derived solely from the audio data itself and does not consider any specific traits or characteristics unique to the user's voice. While this digital signature can authenticate a given audio sample, but it does not provide information about the identity of the user or serve as a means of authenticating the user.

Since this digital signature authentication is based on voice samples, there is a risk of fraud or identity theft if someone gains unauthorized access to the voice samples or the system. Also, voice samples can be easily recorded or imitated, making it difficult to ensure the authenticity and security of the digital signature.

Furthermore, since the existing system relies entirely on the mobile communication device, if the device is lost, stolen, or damaged, it can become difficult to access the necessary location and time information. This can pose challenges in accurately authenticating an individual's presence at a specific location. Mobile communication devices are susceptible to unauthorized access and misuse. If an unauthorized individual gains access to a user's device, they may exploit or manipulate the authentication system. For instance, an attacker could tamper with the voice data or forge location and time information stored on the device, compromising the integrity of the authentication process.

Moreover, many available solutions address either communication device metadata authentication or user authentication separately, failing to integrate them seamlessly. The absence of tamper-proof records further complicates the authentication process, making it challenging to ensure the integrity and authenticity of the information. There are many problems in which communication device metadata needs to be authenticated along with the user verification. Many times, individuals have to prove their identity along with authenticating the communication device metadata such as location, date and time, device information, network information, and other relevant device-specific details.

Therefore, there is a requirement for a system that utilizes multifactor authentication, that enables the generation of more robust and secure digital signatures and combining with voice biometrics, which serves as reliable means of authenticating the communication device metadata with user's authentication, while addressing the drawbacks of existing systems.

STATEMENT OF THE INVENTION

An object of the present invention is to provide a system and method for multi-factor authentication of a communication device metadata with user authentication.

Another object of the present invention is to provide a system and method for multi-factor authentication that combines voice biometrics with digital signature to enhance the authentication of the communication device metadata with user authentication.

Still another object of the present invention is to provide a robust, reliable, and highly secured multifactor authentication system, effectively safeguarding against unauthorized access and identity theft.

The present invention discloses a system and method for implementing multi-factor authentication for a communication device metadata with user authentications. The system combines voice biometrics with digital signature to enhance the security and reliability of communication device metadata authentication with user verification methods across various applications to address real-world problems. The system includes a communication device and a recipient device.

The communication device (such as a smartphone, tablet, computer, or dedicated device) is equipped with an interactive software application. The interactive software application comprising of, a voice recording module, a voice biometrics module, a digital signature module, and a first communication module. The voice biometrics module further consists of a user enrolment module and a user authentication first module, while the digital signature module comprises a digital signature generation module and a digital signature authentication first module.

The system and method for multi-factor authentication of the communication device metadata with user authentication involve the steps of, a user enrolment, PKI digital certificate setup, user authentication, digital signature generation of the communication device metadata with user's voice sample and a unique ID, verification of digital signature authenticity, and authentication of a user's identity, utilization of verified metadata for various use cases.

The user is initially required to enroll into the system. In a present aspect, an interactive software application is installed on the user's communication device and integrated with corresponding software residing on the recipient device. The recipient device refers to an on-premise server, on-premise server/cloud (hybrid), or a cloud server that includes a voice biometrics authentication module, digital signature authentication or verification module, and a second communication module. Specifically, the recipient device includes a user authentication second module for authenticating the user's identity, a digital signature authentication second module to authenticate the generated digital signature, and a second communication module to facilitate communication between the communication device and the recipient device.

For the user registration or enrolment process, system prompts the user to provide a username. After entering the username, the system generates a unique ID that is specific to the user. Then user is prompted to speak a predefined set of specific phrases or words to capture the user's voice samples. The voice recording module records the voice samples, and providing it to the voice biometrics module. The user enrolment module captures the voice signatures from the user's voice samples using advanced signal processing and machine learning algorithms to extract unique voice characteristics from the user's voice sample, such as pitch, frequency, and formants to create a distinct voiceprint for the user. The distinct voiceprint is then associated with the username and the unique ID. The voiceprint, along with its associated identifiers, is stored on either the communication device, on the recipient device, or both. The distinct voiceprint serves as a reference for future authentication attempts, enabling reliable user verification or authentication based on voice biometrics.

After successful enrolment, the user is required to set up Public Key Infrastructure (PKI) digital certificate, which is obtained from a trusted Certificate Authority (CA) by installing it on their respective communication device.

For authenticating the communication device metadata with user authentication, the system provides a security phrase to the communication device. The user would then have to either read the sentence that appears on a screen, or answer a question that is audibly asked via the communication device. The voice recording module records and stores the voice command on either the communication device, on the recipient device, or both and then provides these voice samples to the voice biometrics module. The user authentication first module captures the voice signatures from the voice command and then compares the extracted voice characteristics with the distinct voiceprints, calculating a similarity score that reflects the degree of correspondence between the two samples. To distinguish between genuine and imposter attempts, a threshold value is set. The user is authenticated if the similarity score is above the threshold.

If the user is authenticated, then communication device metadata including but not limited to location, date and time, device information, network information, and other pertinent device-specific details, is accessed.

The digital signature generation module then generates the digital signature by signature object signing the hash object. Typically, multiple digital signatures are created: one using metadata, voice sample, and unique ID; another using the voice sample and unique ID; and a third using the metadata and unique ID.

Specifically, the digital signature generation module (60) employs cryptographic algorithms (SHA256) to generate the hash object of the communication device metadata along with the voice command and the unique ID. Once the hash object is generated, the digital signature generation module (60) generates a signature object using a private key. Further, the signature object signs the hash object to generate a unique digital signature.

These generated digital signatures can be authenticated locally within the communication device or in the recipient device. To authenticate in the recipient device, the generated digital signature, along with the communication device metadata, the voice command and the unique ID are communicated to the recipient device. Specifically, the digital signature authentication second module is adapted to authenticate the generated digital signature, and the user authentication second module is adapted to authenticate the user's identity.

The digital signature authentication process involves checking the authenticity of the digital signature and authenticating the user's identity. The digital signature authentication first module or the digital signature authentication second in module compares the digital signature with the associated communication device metadata, verifying its authenticity.

The digital signature authentication first module or the digital signature authentication second module generates a hash object of the communication device metadata, the voice command, and the unique ID using cryptographic algorithms (SHA256). It then generates the decrypted hash by decrypting the digital signature by using the user's public key. Further, the digital signature authentication first module and the digital signature authentication second module compares the hash object generated during the digital signature authentication method with the decrypted hash. If both the hash objects match, then the digital signature is considered valid, and it signifies that the data have not been altered since the digital signature was generated.

Upon a successful digital signature authentication, the user authentication first module or the user authentication second module captures the voice signatures from the user's voice command and then compares the extracted voice characteristics with the distinct voiceprints to authenticate the user's identity. If user authentication using the distinct voiceprint is successfully verified, the communication device metadata is considered valid and can be used for further processing. Upon authentication of the user's identity, the communication device metadata is sent for further processing which includes but is not limited to approving transactions, allowing entry in restricted areas, providing emergency support, providing access to the services, or verifying alibis.

If the digital signature authentication fails, the system analyses whether the discrepancy lies in the given voice sample or in the metadata. This analysis helps to determine whether there has been any forgery or tampering with the voice sample or metadata parameters, providing insights into the potential security breach.

BRIEF DESCRIPTION OF DRAWINGS

The advantages and features of the present invention will be understood better with reference to the following detailed description and claims taken in conjunction with the accompanying drawings, wherein like elements are identified with like symbols, and in which:

DETAILED DESCRIPTION

An embodiment of this invention, illustrating its features, will now be described in detail. The words "comprising," "having," "containing," and "including," and other forms thereof, are intended to be equivalent in meaning and be open-ended in that an item or items following any one of these words is not meant to be an exhaustive listing of such item or items, or meant to be limited to only the listed item or items.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced items.

The disclosed embodiments are merely exemplary of the invention, which may be embodied in various forms.

The present invention provides a system and method for multi-factor authentication of a communication device metadata with user authentication. The system incorporates voice biometrics and digital signatures to enhance security and authentication in various applications.

Figure 1:
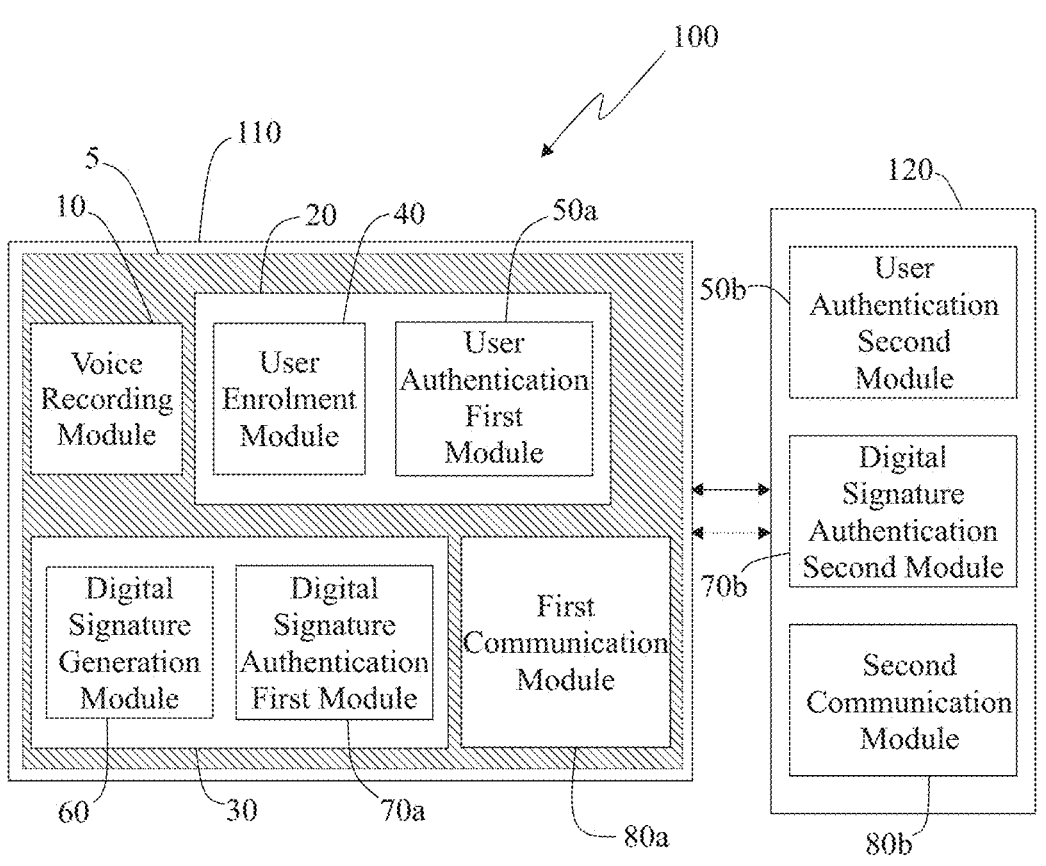
FIG. 1 shows a schematic view of a system for multi-factor authentication of a communication device metadata with user authentication.

Referring now to FIG. 1, a system (100) for multi-factor authentication of a communication device metadata with user authentication in accordance with the present invention is illustrated. The system (100) includes a communication device (110) and a recipient device (120). The communication device (110) is but not limited to a smartphone, tablet, computer, or dedicated device. The communication device (110) is equipped with an interactive software application (5). The interactive software application (5) includes a voice recording module (10), a voice biometrics module (20), a digital signature module (30), and a first communication module (80a). The voice biometrics module (20) further consists of a user enrolment module (40) and a user authentication first module (50a), while the digital signature module (30) includes a digital signature generation module (60) and a digital signature authentication first module (70a). The digital signature module (30) is a critical component provided to enhance the overall security and integrity of the authentication process. The digital signature generation module (60) is responsible for generating the digital signature and the digital signature authentication first module (70a) is responsible for verifying the digital signature authenticity.

The recipient device (120) refers to a server infrastructure that could be located on-premise (physically within the premises), on-premise/cloud hybrid (a combination of on-premise and cloud-based resources), or entirely in the cloud (utilizing remote servers and services accessed over the internet). The recipient device (120) includes a user authentication second module (50b), a digital signature authentication second module (70b), and a second communication module (80b). The second communication module (80b) facilitates communication between the communication device (110) and the recipient device (120). Specifically, the first communication module (80a) and the second communication module (80b) are adapted to establish communication between the communication device (110) and the recipient device (120).

The communication device (110) may include any one of a number of mobile devices including but not limited to smartphone, tablet, computer, or dedicated device. These devices are equipped with a combination of an internal hardware and an interactive software application to facilitate the functionalities described herein. The interactive software application (5) capabilities extend to various operating systems, such as iOS, Android, Windows, Linux and others, ensuring compatibility and effective execution of the applications detailed in this patent.

The interactive software application (5), hereinafter referred to as the "app (5)," is installed on the communication device (110) and integrated with corresponding software residing on the recipient device (120). The app (5) is designed to facilitate, but not limited to, a user enrolment, PKI digital certificate setup, a user authentication, a digital signature generation of the communication device metadata with user's voice sample and a unique ID, authentication of the generated digital signature, and authentication of a user's identity within the multi-factor authentication system (100). The app (5) offers additional features such as displaying user lists and comprehensive reports. The app (5) allows users to customize settings according to their preferences, providing a personalized and user-friendly experience.

The voice recording module (10) is provided to capture and record user's voice samples during a user enrolment process and a user authentication process. Further, the voice recording module (10) stores the user's voice samples on either the communication device (110), the recipient device (120), or both.

The voice biometrics module (20) is a pivotal component provided to enhance the security and reliability of the multi-factor authentication system (100). The voice biometrics module (20) consists of a user enrolment module (40) and a user authentication first module (50a) where the user enrolment module (40) is responsible for enrolling the new users, and the user authentication first module (50a) is responsible for authenticating the user's identity. During both the user enrolment process and the user authentication process, the voice biometrics module (20) plays a crucial role in analysing and processing the captured voice samples.

The communication device metadata refers to the information or data associated with the communication activities of the communication device (110). The communication device metadata provides valuable insights about the communication patterns and behaviours of users. The communication device metadata typically includes, but is not limited to, information such as:

a. Date and Time: The timestamp of when a communication event occurred, including the exact date and time of a call, message, or data transmission.

b. Location: The geographical location of the communication device (110) during the communication event. This information can be derived from Global Positioning System (GPS) data or network cell tower data or using an external GPS device connected to the communication device (110).

c. Duration: The length of time a communication event lasted, like the duration of a phone call or the time taken to send an email.

d. Sender and Receiver Information: The identifiers or addresses of the sender and receiver of a communication, which could be phone numbers, email addresses, IP addresses, usernames, etc.

e. Communication Type: The type of communication event, such as Voice over Internet Protocol (VOIP), voice call, video call, text message, email, or data transfer.

f. Network Information: Details about the network used for communication, including the cellular carrier, Wi-Fi network, or any other network identifier.

g. Device Information: Information about the communication device (110) involved in the communication, such as its unique identifier (IMEI, MAC address), device model, operating system, etc.

h. Call Records: For voice calls, the communication device metadata may include call start time, end time, call duration, call direction (incoming or outgoing), etc.

i. Message Records: For text-based communication, the communication device metadata may include message timestamps, sender, receiver, message content, etc.

j. Internet Communication Metadata: For internet-based communication, the communication device metadata may include IP addresses, ports, protocols, and session information.

Figure 2:
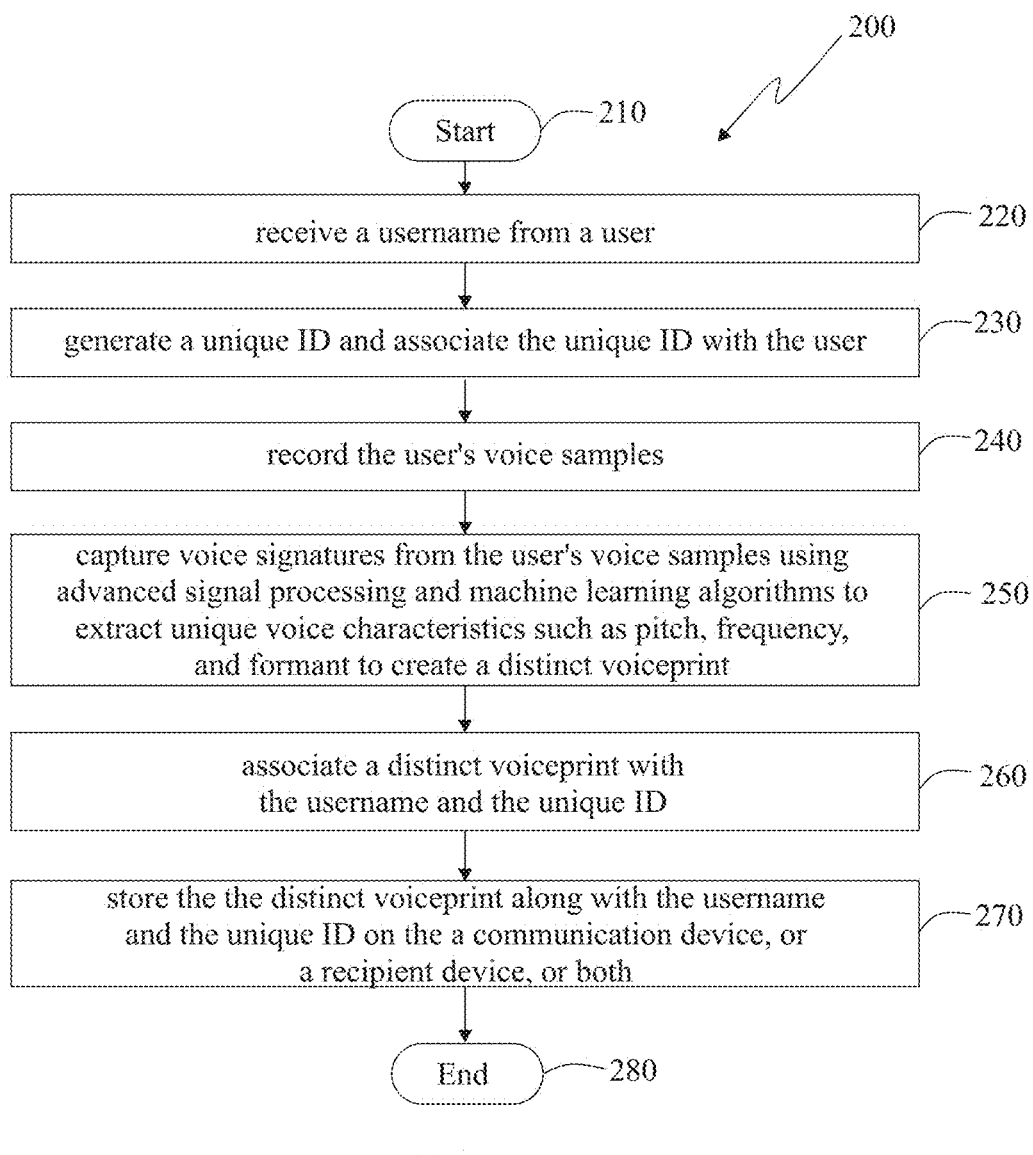
FIG. 2 shows a flowchart of a method for enrolling a new user into the system in accordance with the present invention.

Further, the system (100) is adapted to enroll the new user into the system (100). Specifically, the system (100) prompts the user enrolment process for the new user for providing the hassle-free experience to the users. Referring now to FIG. 2, a method (200) for enrolling the new user is explained in conjunction with the system (100) for the brevity of the invention.

The method (200) starts at step (210).

At step (220), for the user registration or the user enrolment process, the app (5) prompts the user to provide a username. The app (5) receives the username and stores the received username in the communication device (110).

At step (230), app (5) generates a unique ID that is specific to the user, and associates the unique ID to the username.

At step (240), the voice recording module (10) captures and records the user's voice samples, and provides it to the user enrolment module (40).

At step (250), the user enrolment module (40) captures the voice signatures from the user's voice samples using advanced signal processing and machine learning algorithms to extract unique voice characteristics from the user's voice sample, such as pitch, frequency, and formants to create a distinct voiceprint for the user.

At step (260), the distinct voiceprint is then associated with the username and the unique ID for future reference.

At step (270), the distinct voiceprint along with the username and the unique ID are stored on either the communication device (110), on the recipient device (120), or both. The distinct voiceprint serves as a reference for future authentication attempts, enabling reliable user verification or authentication based on voice biometrics.

The method (200) ends at step (280).

After successful enrolment of the user, the user is required to set up a Public Key Infrastructure (PKI) digital certificate, which is obtained from a trusted Certificate Authority (CA) by installing it on the respective communication device (110).

Figure 3:
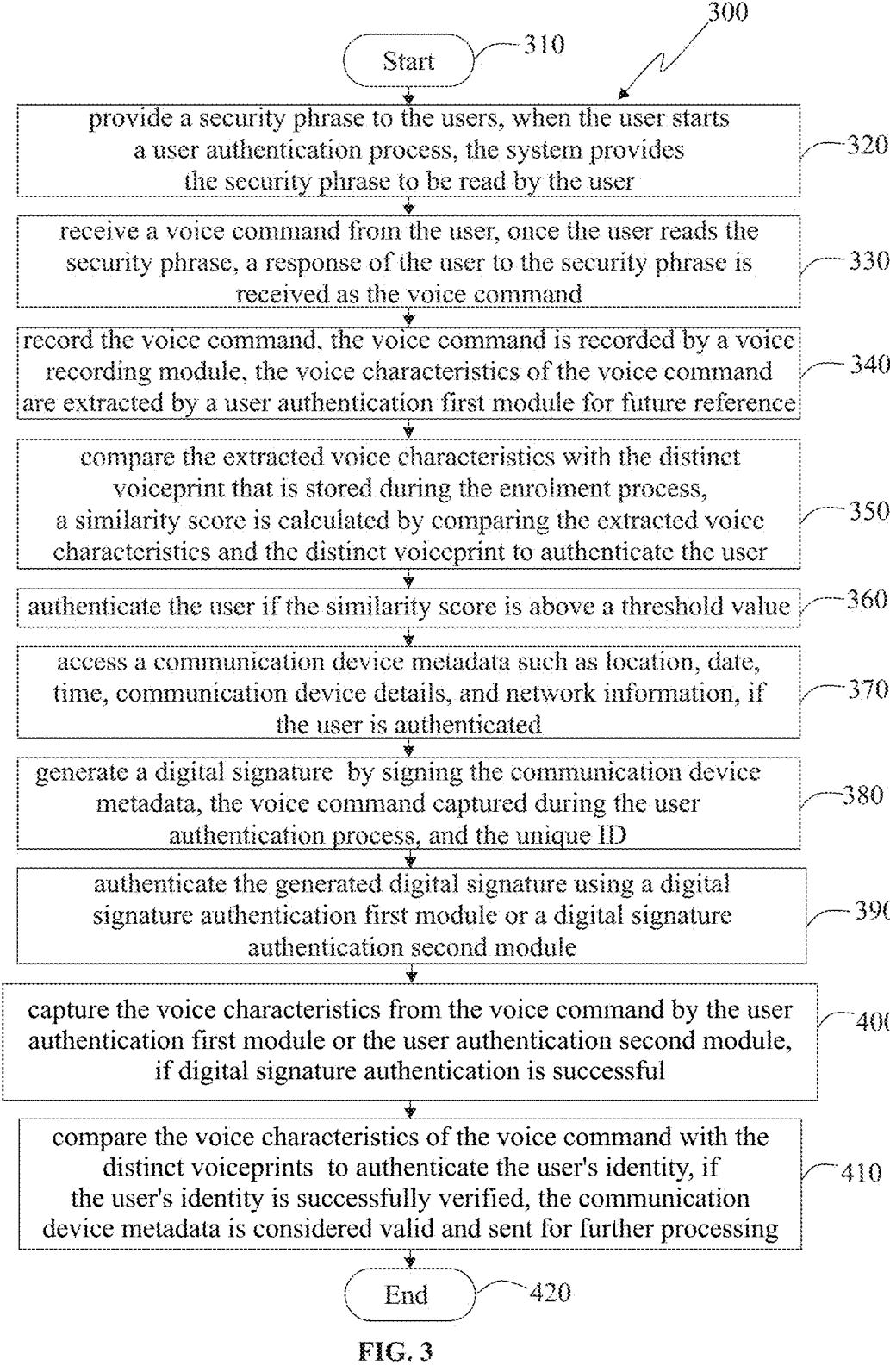
FIG. 3 shows a flowchart of a method for multi-factor authentication of a communications device metadata with user authentication in accordance with the present invention.

Referring now to FIG. 3, a method (300) for multi-factor authentication of a communication device metadata with user authentication is explained in conjunction with the system (100).

The method (300) starts at step (310).

At step (320), the app (5) provides a security phrase to the user to speak unique message generated by the server or answer a question that is audibly asked.

At step (330), once the user reads the security phrase, a response of the user to the security phrase is received by the app (5) as a voice command.

At step (340), the voice recording module (10) records and stores the voice command on either the communication device (110), on the recipient device (120), or both and then provides the voice command to the user authentication first module (50a). The user authentication first module (50a) captures the voice characteristics from the voice command.

At step (350), the user authentication first module (50a) compares the extracted voice characteristics with the distinct voiceprint, calculating a similarity score that reflects the degree of correspondence between the extracted voice characteristics and the distinct voiceprint.

At step (360), to distinguish between a genuine user and imposter attempts, a threshold value is set. The user is authenticated if the similarity score is above the threshold value.

At step (370), upon successful user authentication, the communication device metadata, including information such as location (obtained through GPS), time and date, the communication device information, network details, and other relevant device-specific information, is accessed by the digital signature module (30).

At step (380), a digital signature is generated by signature object signing the hash object. Typically, multiple digital signatures are created: one using the communication device metadata, the voice command, and the unique ID; another using the voice command and the unique ID; and a third using the communication device metadata and the unique ID. The generated digital signature serves as tamper-proof records to verify the digital signature authenticity, and authenticates a user's identity.

At step (390), the generated digital signature is authenticated locally within the communication device (110) or in the recipient device (120). To authenticate in the recipient device (120), the generated digital signature, along with the communication device metadata, the voice command and the unique ID are communicated to the recipient device (120). Specifically, the generated digital signature is authenticated by the digital signature authentication first module (70a) or the digital signature authentication second module (70b).

At step (400), upon successful digital signature authentication, the user authentication first module (50a) or the user authentication second module (50b) captures the extracted voice characteristics from the voice command.

At step (410), the user authentication first module (50a) or the user authentication second module (50b) compares the extracted voice characteristics with the distinct voiceprints stored in the communication device (110) or the recipient device (120) to authenticate the user's identity. If the user's identity is successfully verified, the communication device metadata is considered valid and sent for further processing.

The method (300) ends at step (420).

Figure 4:
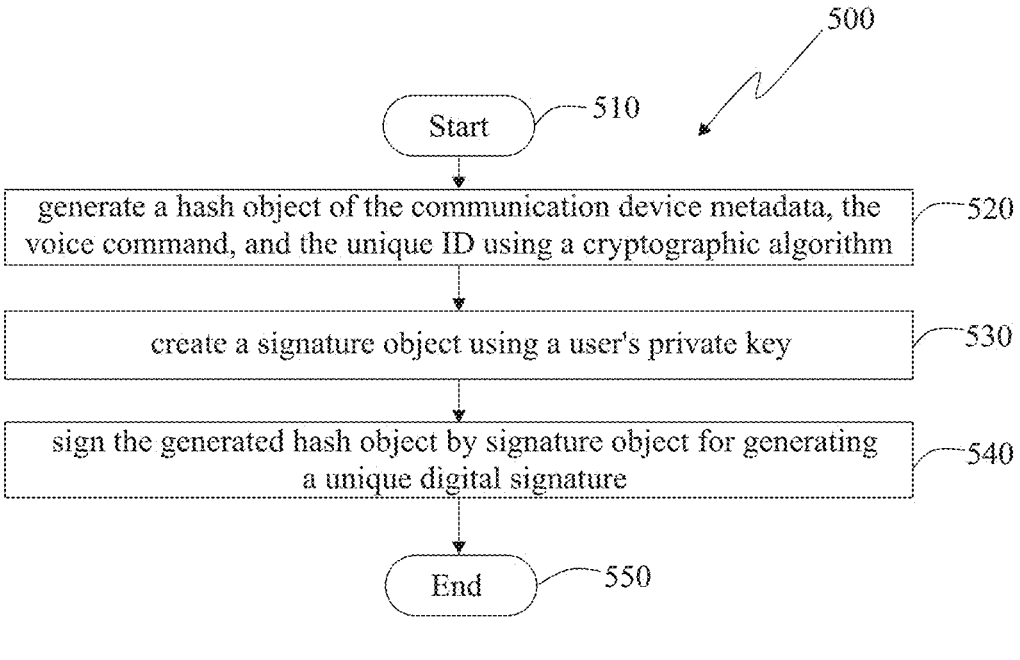
FIG. 4 shows a flowchart of a method for generating a digital signature in accordance with the present invention.

Further referring to FIG. 4, a method (500) is provided to generate the digital signature as described in step (380) of the method (300). The method (500) to generate the digital signature is explained in conjunction with the system (100).

The method (500) starts at step (510).

At step (520), a hash object of the communication device metadata, the voice command captured during the user authentication process and the unique ID is generated.

The digital signature generation module (60) employs cryptographic algorithms (SHA256) to generate the hash object.

At step (530), a signature object is created using the user's private key. The corresponding public key is used to verify the digital signature.

At step (540), the signature object signs the hash object to generate a unique digital signature.

The method (500) ends at step (550).

The digital signature functions as a certificate scheme including but not limited to the verification of the identity of person, organization, or metadata such as messages, biometrics data, location with a timestamp, etc. The digital signature serves as proof of the authenticity and integrity of electronic documents or messages, ensuring they cannot be forged, altered, or tampered with.

The user's private key is used to generate the digital signature, while the public key is used to authenticate the generated digital signature. The public key and the private key pairs used for digital signature generation and authentication is included in a digital certificate, issued by a trusted entity known as a Certification Authority (CA). The process of obtaining a digital certificate from a CA involves several steps:

a. Generating a key pair.

b. Creating a Certificate Signing Request (CSR).

c. Submitting the CSR to the CA.

d. Verifying the identity.

e. Issuing a digital certificate.

f. Installing the digital certificate.

g. Configuring and using the digital certificate.

h. Renewing the digital certificate.

Several algorithms, including but not limited to SHA, RSA, DSA, ECDSA, and EdDSA, can be used for generating and authenticating digital signatures, each with its unique characteristics and applications.

Figure 5:
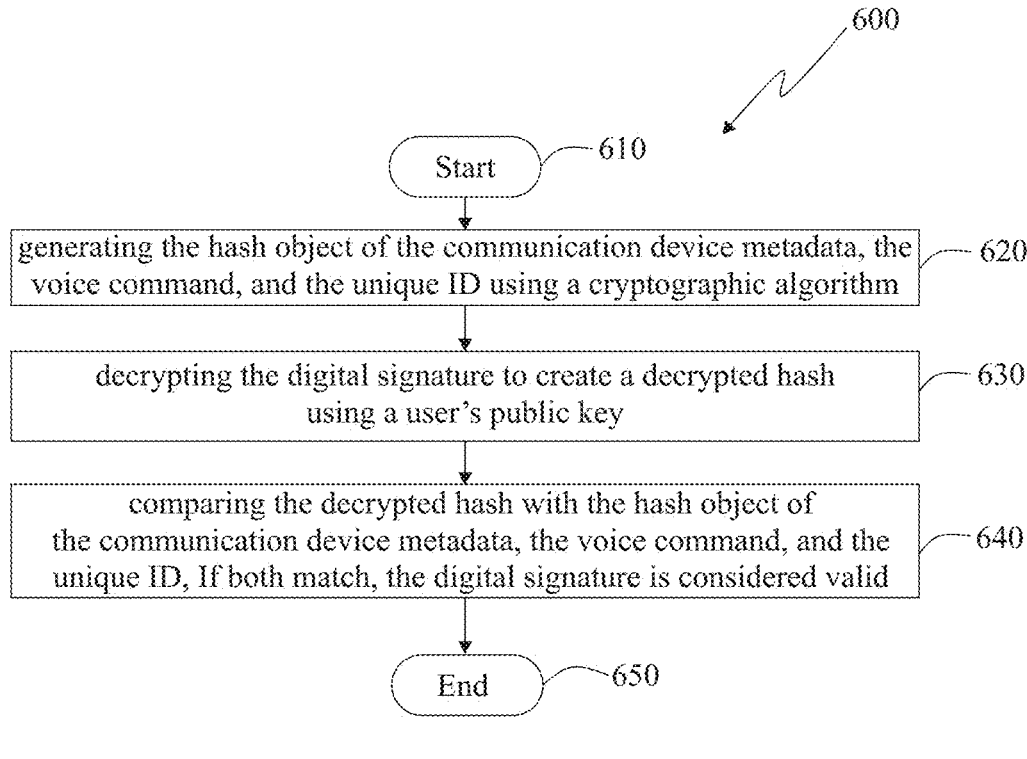
FIG. 5 shows a flowchart of a method for authenticating the generated digital signature in accordance with the present invention.

Referring now to FIG. 5, a method (600) is provided for authenticating the generated digital signature as described in step (390) of the method (300). The method (600) for authenticating the generated digital signature is explained in conjunction with the system (100).

The method (600) starts at step (610).

At step (620), the method (600) for authenticating the generated digital signature involves checking the authenticity of the generated digital signature. After receiving the generated digital signature attached to the communication device metadata, the voice command, the unique ID, and the user's public key, the digital signature authentication first module (70a) performs authentication of the digital signature. The digital signature authentication first module (70a) generates a hash object of the communication device metadata, the voice command, and the unique ID. Specifically, the digital signature authentication first module (70a) uses a cryptographic algorithm (SHA256) to generate the hash object.

At step (630), the digital signature authentication first module (70a) generates the decrypted hash by decrypting the digital signature by using the user's public key. To verify the digital signature, one needs to have the communication device metadata, the voice command, the unique ID and the user's public key.

In another embodiment, if the generated digital signature attached to the communication device metadata, the voice command, and the unique ID is received by the recipient device (120), the steps (620) and (630) are performed by the digital signature authentication second module (70b).

At step (640), the digital signature authentication first module (70a) compares the hash object generated at step (620) with the decrypted hash generated at step (630). If both match, then the digital signature is considered valid, and it signifies that the data have not been altered since the digital signature was generated. This alignment serves as a strong indicator of the authenticity and integrity of the data.

In another embodiment, if the generated digital signature attached to the communication device metadata, the voice command, and the unique ID is received by the recipient device (120), step (640) of comparing the hash object generated at step (620) with the decrypted hash at step (630) is performed by the digital signature authentication second module (70b).

The method ends at step (650).

Upon successful digital signature authentication, the user authentication first module (50a) captures the voice characteristics from the voice command and then compares the extracted voice characteristics with the stored distinct voiceprints to authenticate the user's identity. If user authentication using the voice command and the distinct voiceprint is successfully verified, the communication device metadata is considered valid and can be used for further processing.

If the digital signature authentication fails, the system (100) initiates an in-depth analysis to identify the source of the discrepancy. This analysis examines whether the issue lies within the voice command or the associated communication device metadata. This level of scrutiny helps identify potential instances of forgery or tampering, providing valuable insights into potential security breaches.

Figure 6:
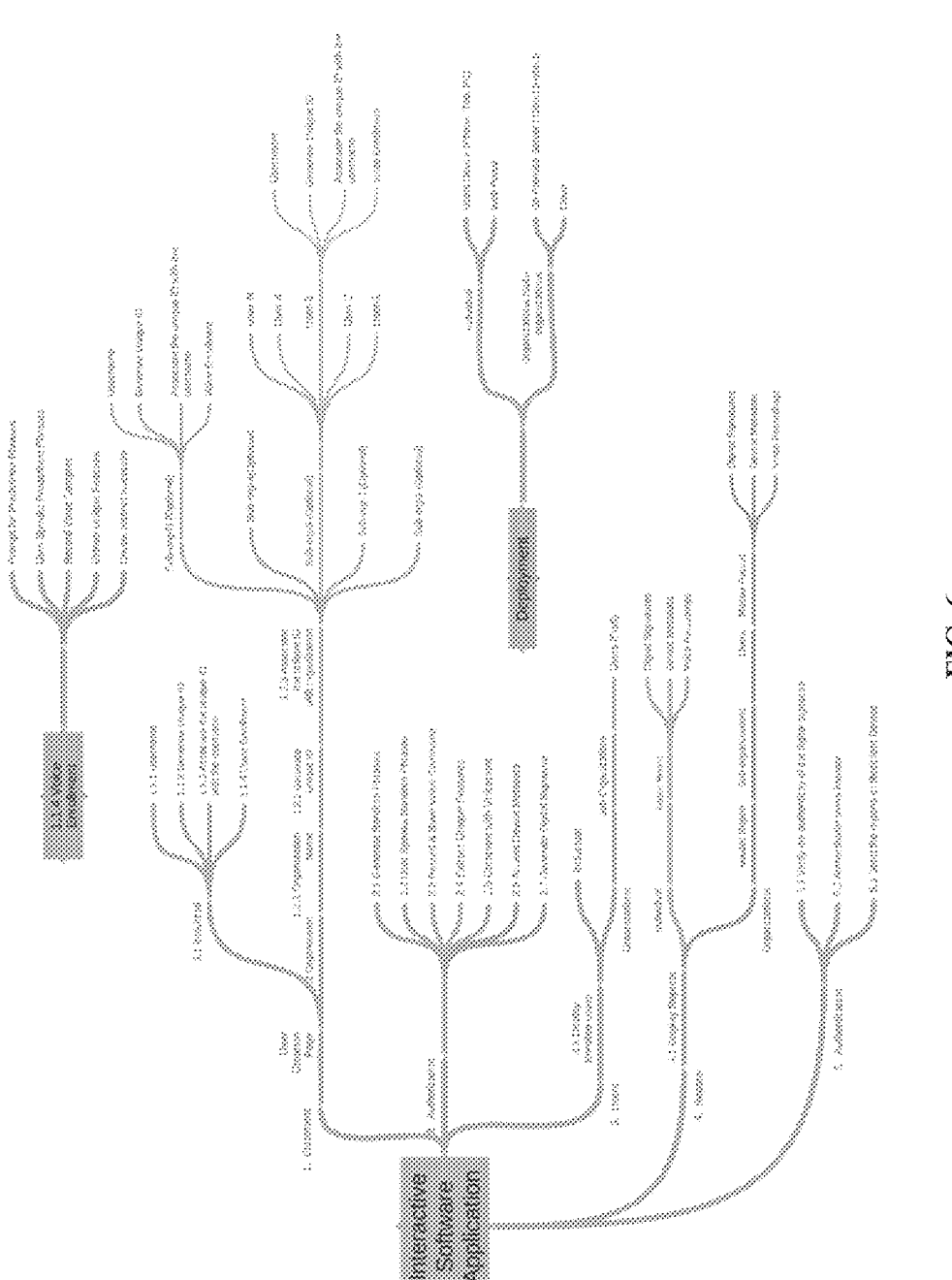
FIG. 6 shows a schematic illustration of an interactive software application in accordance with the present invention.

In one non-limiting embodiment, a user, in the context of an individual, may download the app (5) onto their device and use it for self-authentication (individual mode) as illustrated in FIG. 6.

In another non-limiting embodiment, the user represents an organization, where the organization acts as the parent entity, managing sub-organisations and other staff members who are users as illustrated in the FIG. 6.

Further, for better understanding of the invention, the working of the present invention is explained with respect to the interactive software application (5).

Figure 7:
FIG. 7 shows a schematic illustration of an interactive software application user interface (UI) screen in accordance with the present invention.

First, users start by accessing the app (5) on the communication device (110). Upon opening the app (5), users are presented with the main screen, which provides several options, including "Enrolment" (as shown in FIG. 6 and FIG. 7). Users select the "Enrolment" option from the main screen to initiate the user enrolment process. Once in the "Enrolment" section, users are directed to the "User Creation Page." Here, they have two main options for enrolment: "Individual" or "Organization". If the user selects "Individual," they proceed to the individual enrolment process. They are prompted to provide the necessary information and a username. The system generates a unique ID specific to the user. If the user selects "Organization," they enter the organization's details, such as the organization type. Similar to individual enrolment, a unique ID is generated for the organization. If the user's selection is "Organization," the app (5) allows for the enrolment of sub-organization accounts (optional) under organization and user accounts (staff) under the sub-organization. For sub-organization accounts, the app (5) generates unique IDs for each one. For user accounts (staff), the app (5) generates unique IDs for each staff member. Multiple sub-organization accounts can be created and under that multiple user accounts can be created.

After the initial setup, the users, whether individual or part of an organization, are prompted to proceed to the "User Enrolment" process. During the user enrolment process, the users are asked to read predefined phrases or words provided by the app (5) while pressing the "Start Recording" button. The app (5) records the voice samples of the user and captures unique voice characteristics, such as pitch, frequency, and formants and generates a distinct voiceprint for the user. The distinct voiceprint, along with its associated identifiers, is securely stored on either the communication device (110), on the recipient device (120)/a server in the cloud, or both, serving as a reference for future authentication attempts. After successfully enrolling and creating a distinct voiceprint, the user is notified that the enrolment process is completed.

Following the successful completion of the enrolment process, the user is required to set up a Public Key Infrastructure (PKI) digital certificate, which is obtained from a reputable and trusted Certificate Authority (CA).

Users select the "Authorize" section from the main screen to initiate the authorization process. In the "Authorization" section, the app (5) generates random phrases or sentences that users are required to read aloud for authentication purposes. These phrases are designed to be unique for each authorization attempt. Users are prompted to press the "Start Recording" button to begin the recording of their voice as they read the generated phrases. The recorded audio is saved on either the communication device (110), on the recipient device (120), or both.

The app (5) then extracts the unique characteristics and compares the newly recorded audio with the stored voice-print of the user that was created during the enrolment process. The app calculates a similarity score that reflects the degree of correspondence between the newly recorded audio and the stored voiceprint. This score is used to determine if the user's voice matches their enrolled voiceprint. To distinguish between genuine users and imposters, a threshold value is set. If the calculated similarity score is above the threshold, the user is authenticated.

Upon successful authentication, the app (5) gains access to device metadata, device metadata including but not limited to location, date and time, device information, network information, and other pertinent device-specific details. Digital signatures are generated by hashing voice recordings and device metadata. Typically, multiple digital signatures are created: one using metadata, voice sample, and unique ID; another using the voice sample and unique ID; and a third using the metadata and unique ID. These digital signatures serve as tamper-proof records and can be used for verification and investigation purposes.

Under the "Users" menu of the app (5), users find a listing of all enrolled users associated with their account. This listing includes both individual and organization-level users. Each user entry typically includes their username and a unique ID associated with their account.

Under the "Reports" menu of the app (5), users find a listing of various reports, including master reports, digital signature certificates, device metadata, voice recordings.

For individual users, the app (5) is directly installed on the user's personal devices, including smartphones, tablets, personal computers, or accessible through a web portal. This approach ensures a user-friendly and easily accessible experience for individual authentication needs.

In the case of organizations or sub-organizations with multiple users, the deployment strategy expands to accommodate the broader infrastructure requirements. Two primary options are outlined:

a) On-Premise Server/Cloud (Hybrid): Organizations can opt for an on-premise server deployment. This entails hosting app on servers physically located within the organization's premises or a hybrid model that combines both on-premise and cloud resources. The hybrid approach offers a balance between the control of on-premise servers and the scalability of the cloud.

b) Cloud: Alternatively, organizations may choose a cloud-based deployment, leveraging the scalability and accessibility of cloud services. This can be a pure cloud deployment, where the entire system operates on cloud servers.

Figure 8:
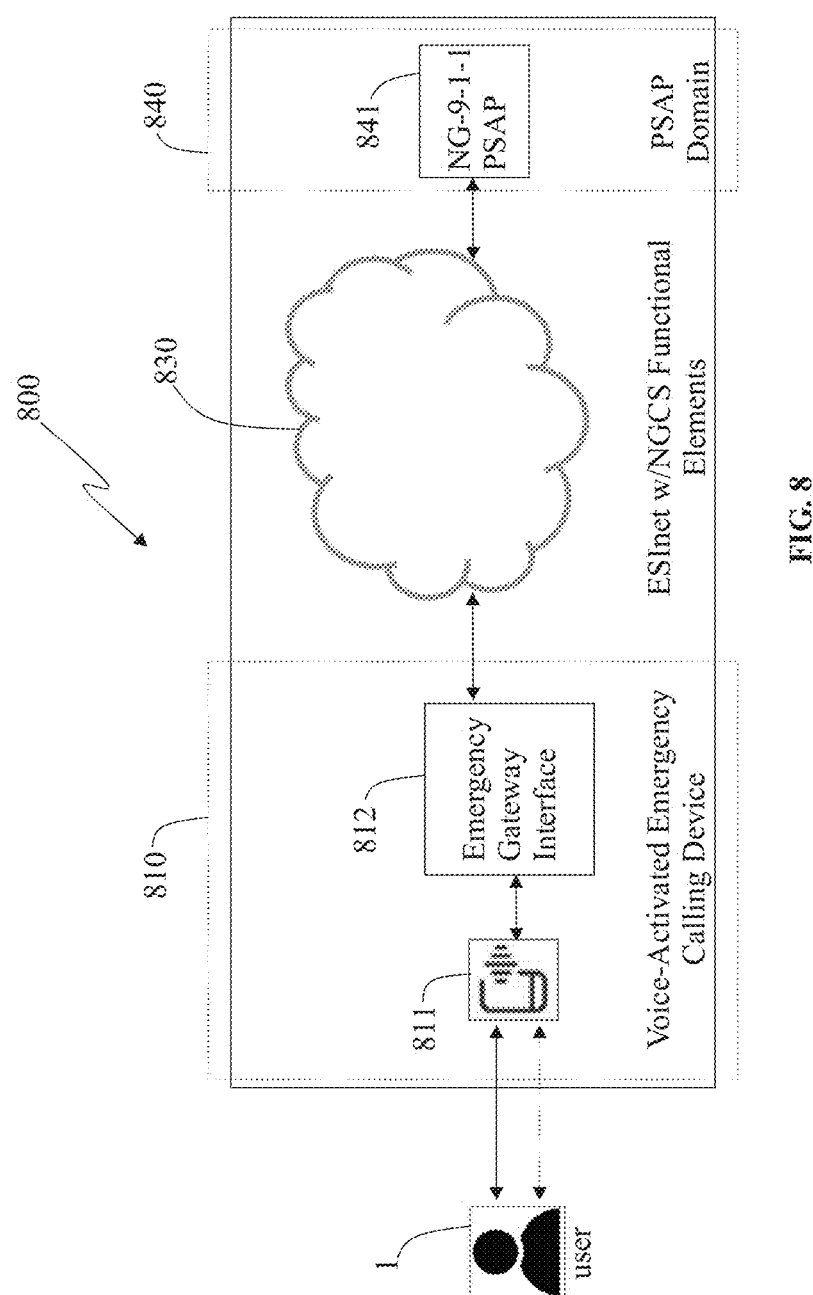
FIG. 8 shows a schematic view of an exemplary embodiment of the present invention within the context of a 9-1-1 emergency calling system.

Referring now to FIG. 8, a system (800) for authenticating a communication device metadata with user authentication can be explained by considering the example of a 9-1-1 emergency calling system. This use case describes the integration of PKI digital certificates for critical emergency payload such as User Profile Data, Device ID, Incident Description, Caller's Emergency Location with Timestamp, Service Address, User's Biometric Data (such as Voice) within the secured voice-activated 9-1-1 emergency calling system (800). Hereinafter "the secured voice-activated 9-1-1 emergency calling system (800)" is referred to as "the system (800)". This integration enhances the emergency response process, increases security and mitigates the misuse of emergency services. The solution ensures the authentication of physical presence of the communication device (110) along with an identifiable user at a given location at a particular time, thereby enhancing the overall reliability and effectiveness of emergency responses.

The system (800) includes a voice-activated emergency calling device (810), a ESInet/NGCS network (830) and a PSAP domain (840). The voice-activated emergency calling device (810) includes a Voice-Activated Emergency Calling Interface (811), which is always in listening mode. Hereinafter, "Voice-Activated Emergency Calling Interface (811)" is referred to as "the device (811)" The device (811) continuously listens for user voice commands that include valid wake words, and utilizes trigger command recognition using Automatic Speech Recognition (ASR) technology. If ASR recognizes valid wake and command words, then the system (800) will check for enrolled or trusted user recognition using voice biometrics technology. If a biometric match is detected, the device (811) will then process the command by initiating emergency request and generating digital signature for critical emergency payload. This digital signature is routed to the ESInet/NGCS Network (830) which then routes it to the PSAP Domain (840). Further, a NG9-1-1 PSAP (841) validates the digital signature and respond to the emergency request, so that those in an emergency situation can be provided the safety, security and more accurate response ultimately resulting in better outcomes.

Further, the voice-activated emergency calling device (810) includes the emergency gateway interface (812), which provides various services for providers (such as alarm monitoring centres, telecom providers, or campus alerting system vendors) to create custom device end points, configure, handle and route the emergency call and other notifications. The voice-activated emergency calling device (810) may use SIP or Proprietary Protocol to access these services for outbound and inbound calling to achieve two-way communication.

Further, the integration of PKI digital certificates within the system (800) includes following steps:

User Enrolment

Firstly, the users (1) are required to enroll with the 9-1-1 emergency service provider through the device (811) which could be a dedicated device or a mobile application. During enrolment process, users (1) need to provide personal information, such as username, phone number, address, medical history, emergency contacts which create the unique ID specific to the user (1) and establish their profile within the system (800). After that users (1) are prompted to speak specific phrases or words as part of the voice enrolment process. The voice signature extraction algorithms analyse the voice samples to extract unique voice characteristics, and creates a distinct voiceprint. This voiceprint is associated with the corresponding user's ID and stored securely on the device (811) and within a secure server maintained by the emergency service provider for future authentication.

PKI Digital Certificate Setup

After successful enrolment, users would need to set up their PKI digital certificate obtained from a trusted Certificate Authority (PCA) by providing certificate details to the emergency service provider and installing it on their device (811) to use digital certificate for emergency service request.

Emergency Alert Initiation and Digital Signature Creation

When an enrolled user (1) says a voice command like "Hey Device, call 9-1-1," system (800) initiates the emergency alert and then fetches geographical coordinates of the user's location via GPS/GNSS. Further the system (800) hashes the critical emergency payload and generates a unique digital signature.

This digital signature includes hash calculation of the following critical emergency payload details:

a. User Information: User details, such as unique identifiers or usernames, phone number medical history, emergency contacts which aids in identifying the caller and establishing a connection with their registered profile.

b. Device ID: A unique device identifier for authenticating physical presence of a personal communications device.

c. Incident Description: A concise description of the reported incident or emergency situation (such as intruder attack, physical assault, robbery, medical emergencies etc.) which provides immediate context to emergency responders, enabling them response accordingly.

d. Caller's Emergency Location with timestamp: The precise geographical coordinates of the caller's location ensures that emergency responders can accurately pinpoint the caller's whereabouts, expediting their arrival at the scene. The exact time of the emergency service request is captured within the signature.

e. Service Address: User's service address, providing additional context and aiding emergency responders in reaching the caller effectively.

f. Biometric data (User Voice Recordings): A user's voice recordings, obtained during the voice command.

Digital Signature Verification

The system (800) sends the generated digital signature along with the critical emergency payload to the ESInet/NGCS Network (830) which subsequently routes it to the PSAP Domain (840). The NG9-1-1 PSAP (841) verifies the digital signature's authenticity for validating the critical emergency payload.

User Verification

Simultaneously, the NG9-1-1 PSAP (841) can perform additional user verification by validating voice recordings with the user's voiceprint stored on the server. This step adds an extra layer of assurance that the caller is genuinely in need of emergency assistance.

Emergency Response

Upon successful completion of validations, the PSAP domain (840) can proceed with dispatching the appropriate emergency response. If necessary, the PSAP domain (840) can initiate a callback to the user (1) for further verification or clarification.

Figure 9:
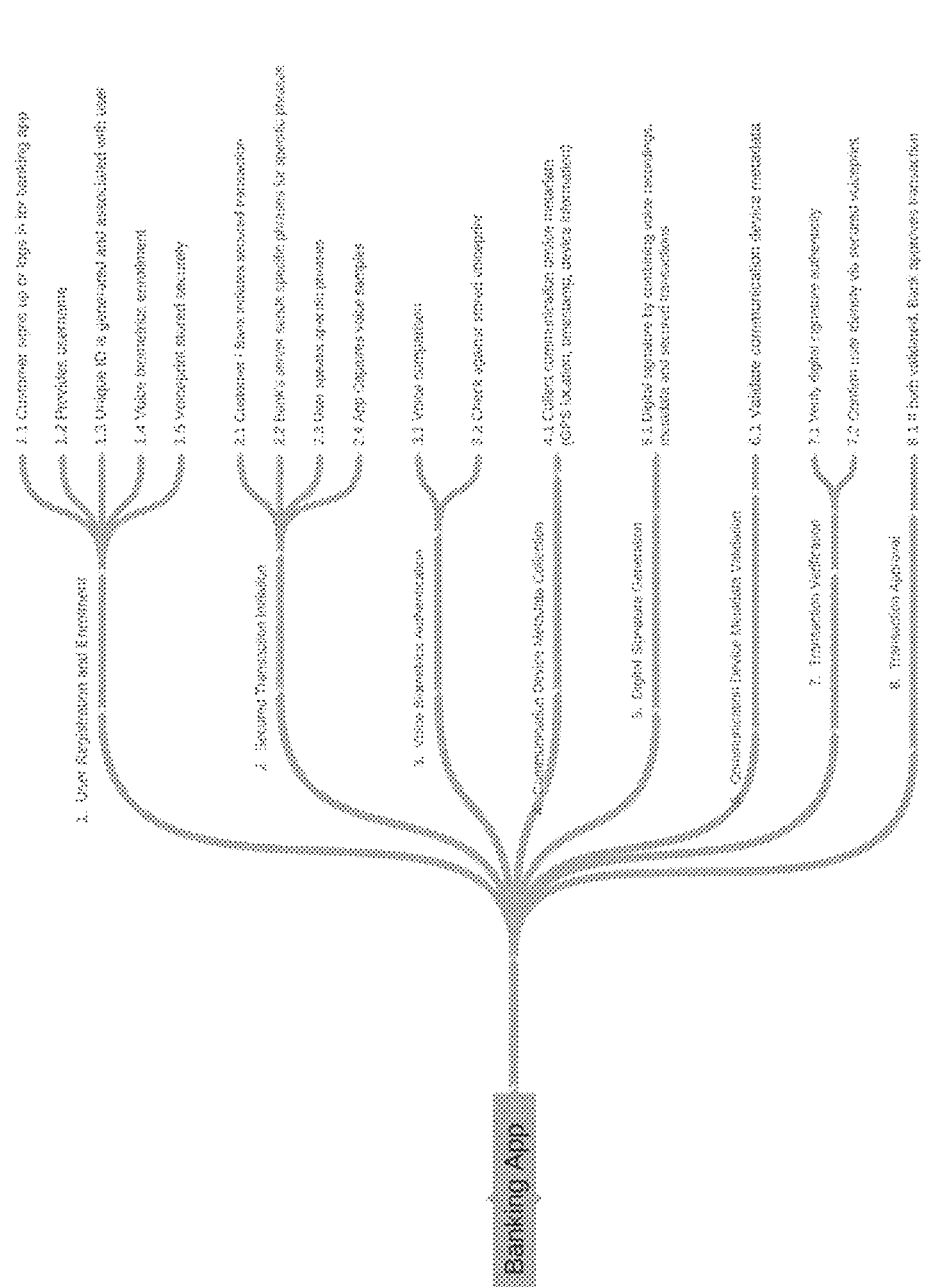
FIG. 9 illustrates a schematic view depicting the multi-factor authentication process within the context of a banking scenario.

The system (100) for multi-factor authentication of the communication device metadata with user authentication can be explained in the context of a bank as illustrated in FIG. 9. When a customer or the bank initiates a secure banking transaction, such as transferring money or accessing highly confidential financial information through mobile banking app or a web portal, they must navigate through a robust multi-factor authentication procedure to safeguard the transaction's confidentiality and integrity.

After signing up or logging in for the mobile banking app, which is installed on the user's device integrated with software residing on bank cloud server, the customer is required to enroll in the multi-factor authentication system. During enrolment, the customer provides a username and the system creates unique ID that is specific to the user. Then user goes through the voice biometrics enrolment process, where user speaks predefined phrases to create their distinct voiceprint. Voiceprint is stored securely within a secure server maintained by the bank. The bank issues a PKI digital certificate to the customer, which he installs on his mobile device or computer.

When the customer or the bank initiates the secured transaction, the bank's system sends the specific phrases generated by the system. Customer speaks the specific phrases. The system captures the customer's voice samples and compares them to enrolled voiceprint. A similarity score is calculated, and if it exceeds the threshold, the customer is authenticated based on voice biometrics. Upon successful authentication, the system collects the communication device metadata, including the device's current location (GPS coordinates) and timestamp.

The digital signature is generated by combining the voice recordings, the communication device metadata (location and timestamp) with the transaction details. The bank's system receives the digitally signed transaction data, including the communication device metadata and voice recordings, from the customer's device. It verifies the authenticity of the digital signature to ensure that the transaction details and communication device metadata have not been tampered with. This helps prevent fraudulent transactions by confirming that the user is indeed at the claimed location and time. Simultaneously, the system confirms the user's identity by comparing their voice recording with the enrolled secured voiceprint.

Upon successful voice biometrics authentication and validation of the communication device metadata, the bank approves the transaction. The transaction is executed securely, and the customer gains access to the requested financial information or successfully transfers funds. If there are any discrepancies in the voice biometrics, the digital signature, or the communication device metadata, the system can flag the transaction for further investigation. This analysis helps identify potential security breaches, fraud attempts, or unauthorized access.

Figure 10:
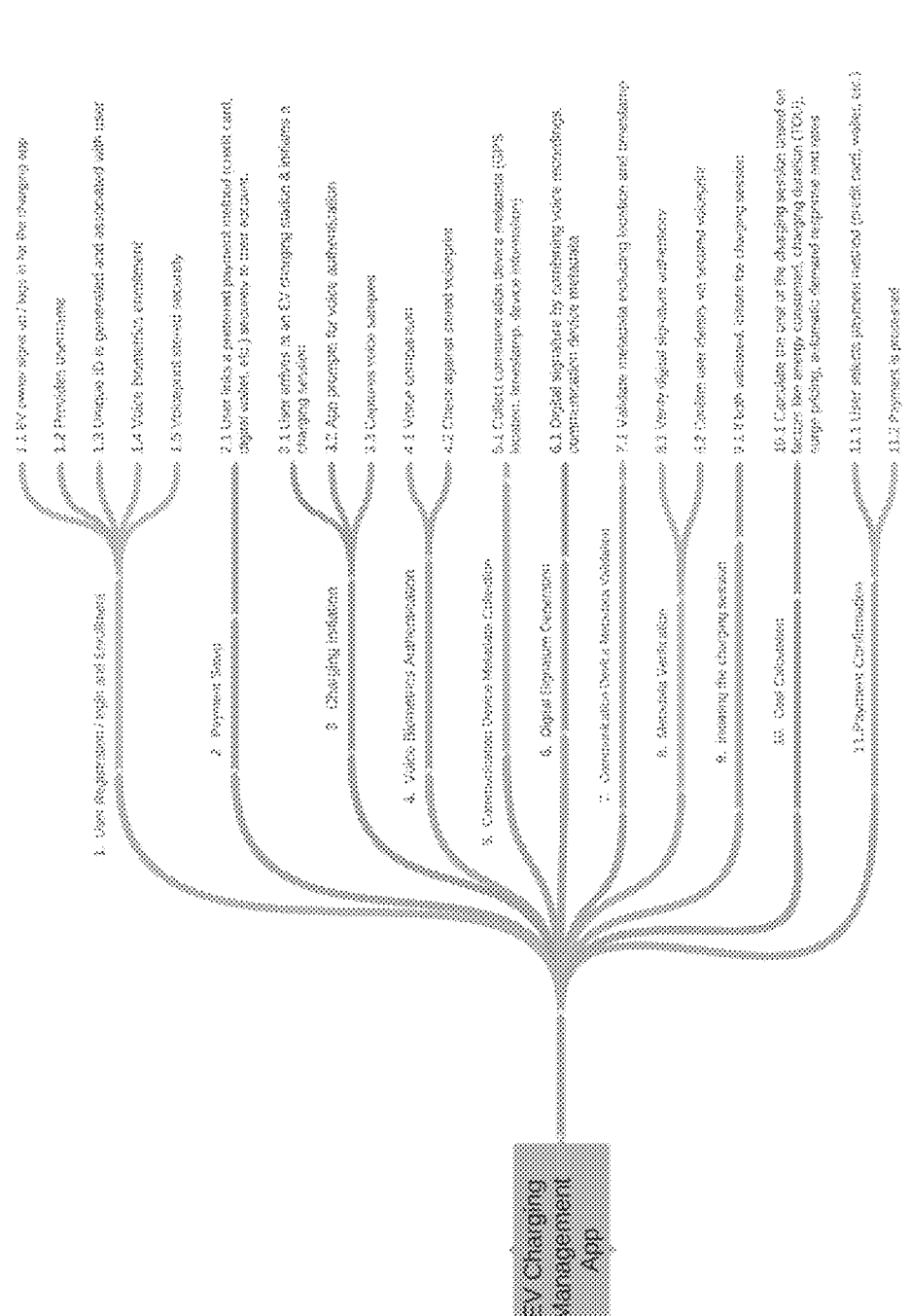
FIG. 10 illustrates a schematic view depicting the multi-factor authentication process within the context of an Electric Vehicle (EV) charging management scenario.

In another exemplary embodiment illustrated in FIG. 10, EV owners sign up or log in to the EV charging management app hosted on central server or a cloud-based server that is owned, operated, and maintained by the organization or company providing the EV charging services. They provide a username and enroll in voice biometrics, securely storing their voiceprint. When an EV owner arrives at a charging station and starts a charging session through the app, it prompts them for voice authentication. This involves reading random phrases or answering security questions, and the app (5) records the response. The app (5) captures voice samples and compares them to the stored voiceprint for user authentication. If the user is authenticated, the app (5) collects the communication device metadata such as GPS location, timestamp, and device information. A digital signature is generated by combining the voice recordings and the communication device metadata. The digital signature, along with the communication device metadata, is sent to the server for verification. The server validates the communication device metadata, including location and timestamp, and verifies the authenticity of the digital signature. If both checks are successful, the server confirms the user's identity and initiates the charging session. After the charging session, the app (5) calculates the cost based on factors like energy consumed, charging duration, surge pricing, automatic demand response, and rates. The user then selects the preferred payment method, such as a credit card or wallet, and the payment is processed. This entire process ensures a secure and seamless experience for EV owners during the charging process.

In an additional embodiment and not limited to the scenarios described above, the system for authenticating the communication device metadata with user authentication can be applied to various use cases where secure and reliable authentication is essential.

The foregoing descriptions of specific embodiments of the present invention have been presented for purposes of illustration and description. They are not intended to be exhaustive or to limit the present invention to the precise forms disclosed, and obviously, many modifications and variations are possible in light of the above teaching. The embodiments were chosen and described in order to explain the principles of the present invention best and its practical application, to thereby enable others skilled in the art to best utilise the present invention and various embodiments with various modifications as are suited to the particular use contemplated. It is understood that various omission and substitutions of equivalents are contemplated as circumstance may suggest or render expedient, but such are intended to cover the application or implementation without departing from the scope of the claims of the present invention.

The invention claimed is:

1. A system for multi-factor authentication of a communication device metadata with user authentication comprises:
   a communication device equipped with an interactive application module, the communication device further comprising:
   a voice recording module to capture, record and store user's voice sample during a user enrolment process, and a user authentication process;
   a voice biometrics module having a user enrolment module to enroll new users, and a user authentication first module to authenticate a user's identity based on voice characteristics of a user command, wherein the user enrolment module is adapted to create a distinct voiceprint from the user's voice samples, the user authentication first module is configured to receive a voice command from an enrolled user to authenticate the user;
   a digital signature module having:
      a digital signature generation module configured to generate a digital signature by combining a communication device metadata, the user's voice sample and unique ID after authenticating the user from the voice command;
      a digital signature authentication first module configured to authenticate the generated digital signature in the communication device, or sent the generated digital signature to a recipient device to authenticate the generated digital signature; and
   a first communication module configured to communicate the generated digital signature, the communication device metadata, the voice command and the unique ID with the recipient device;
   the recipient device comprises;
      a second communication module to facilitate communication between the communication device and the recipient device;
      a digital signature authentication second module to authenticate the generated digital signature;

a user authentication second module for authenticating the user's identity.

2. The system as claimed in claim 1, wherein the user enrolment module is adapted to capture the voice signatures from the user's voice samples using advanced signal processing and machine learning algorithms to extract unique voice characteristics from the user's voice sample, such as pitch, frequency, and formants to create the distinct voiceprint for the user.

3. The system as claimed in claim 1, wherein the generated digital signature is authenticated by the digital signature authentication first module or the digital signature authentication second module, wherein upon successful digital signature authentication, the user authentication first module or the user authentication second module captures the voice characteristics from the user command and then compares with the distinct voiceprint to authenticate the user's identity.

4. The system as claimed in claim 1, wherein the user authentication first module of the communication device is adapted to authenticate the user's identity within the communication device.

5. The system as claimed in claim 1, wherein the digital signature authentication first module of the communication device is adapted to authenticate the generated digital signature within the communication device.

6. The system as claimed in claim 1, wherein the digital signature generation module utilizes cryptographic algorithms to generate the digital signature.

7. The system as claimed in claim 1, wherein the digital signature authentication first module and the digital signature authentication second module utilizes cryptographic algorithms to decrypt the generated digital signature.

8. The system as claimed in claim 1, wherein the user enrolment process for enrolling the new user comprises the steps of:
   receiving a username from the user;
   generating the unique ID and associating the unique ID with the user;
   recording the user's voice samples;
   capturing voice signatures from the user's voice samples using advanced signal processing and machine learning algorithms to extract unique voice characteristics from the user's voice samples such as pitch, frequency, and formants, to create a distinct voiceprint for the user;
   associating the distinct voiceprint with the username and the unique ID; and
   storing the distinct voiceprint along with the username and the unique ID on the communication device, the recipient device, or both.

9. The system as claimed in claim 1, wherein the system is configured for performing multi-factor authentication of the communications device metadata with user authentication comprises the steps of:
   providing, by the system, a security phrase to the users, for user authentication;
   receiving the voice command from the user, a response of the user to the security phrase is received as the voice command by the communication device;
   recording the voice command, the voice command is recorded by the voice recording module and the voice characteristics of the voice command are extracted for future reference;
   comparing the extracted voice characteristics with the distinct voiceprint that is stored during the user enrolment process, a similarity score is calculated by comparing the extracted voice characteristics and the distinct voiceprint to authenticate the user;

authenticating the user if the similarity score is above a threshold value;

accessing the communication device metadata such as location, date, time, communication device details, and network information, if the user is authenticated;

generating the digital signature by signature object signing a hash object;

authenticating the generated digital signature using the digital signature authentication first module or the digital signature authentication second module;

capturing the voice characteristics from the voice command, the user authentication first module or the user authentication second module captures the voice characteristics from the voice command; and comparing the voice characteristics of the voice command with the distinct voiceprints to authenticate the user's identity, if the user's identity is successfully verified, the communication device metadata is considered valid and sent for further processing.

10. The system as claimed in claim 9, wherein the generated digital signature along with the communication device metadata, the voice command, and the unique ID is communicated to a recipient device to authenticate the generated digital signature and user's identity, wherein the recipient device includes the digital signature authentication second module to authenticate the generated digital signature, and the user authentication second module to authenticate the user's identity.

11. The system as claimed in claim 9, wherein generating the digital signature comprises the steps of:

generating a hash object of the communication device metadata, the voice command, and the unique ID using a cryptographic algorithm (SHA256);

creating the signature object using a user's private key;

signing the generated hash object by the signature object for generating a unique digital signature.

12. The system as claimed in claim 9, wherein authenticating the generated digital signature comprises the steps of:

generating a hash object of the communication device metadata, the voice command, and the unique ID using a cryptographic algorithm (SHA256);

decrypting the digital signature to create a decrypted hash using a user's public key;

comparing the decrypted hash with the hash object of the communication device metadata, the voice command, and the unique ID, if both match, the digital signature is considered valid.

* * * * *